Patented Sept. 15, 1925.

1,554,033

UNITED STATES PATENT OFFICE.

EBENEZER EMMET REID, OF BALTIMORE, MARYLAND, ASSIGNOR TO E. I. DU PONT DE NEMOURS & COMPANY, OF WILMINGTON, DELAWARE, A CORPORATION OF DELAWARE.

CELLULOSIC COMPOSITION.

No Drawing. Application filed February 4, 1921. Serial No. 442,474.

*To all whom it may concern:*

Be it known that I, EBENEZER EMMET REID, a citizen of the United States, and a resident of Baltimore, in the State of Maryland, have invented certain new and useful Cellulosic Compositions, of which the following is a specification.

This invention relates to cellulosic compositions containing as an essential constituent a neutral butyl phthalate, and has reference more particularly to cellulose nitrate plastics containing dibutyl phthalate.

In the practical application of dissolved cellulose and soluble cellulose compounds, including cellulose esters, to the various arts and manufactures, such as the production of films, varnishes, filaments, plastic masses, etc., it is customary to blend or mix or otherwise add to the cellulose ester or to its solution, certain non-cellulosic materials commonly termed softeners, camphor substitutes or the like, such additions being made for the purpose of imparting to the cellulose or its compounds some desired properties, such as non-inflammability, plasticity under heat, flexibility, etc. These softeners, camphor substitutes and the like, which I shall hereinafter for convenience designate as "modifiers," function in many different ways in cellulosic combinations; and the properties which they impart to the product depend upon and are determined by both the physical and the chemical properties of the particular modifier used. For example, if a modifier is non-inflammable, it will impart this property to the cellulose to a degree which is of course dependent upon the character of the modifier and the proportion added; if the modifier is relatively non-volatile its effect will be more permanent than that of a more volatile modifier; if the modifier is a solvent under suitable conditions for the cellulose material, it will as a rule impart greater flexibility than if it is a non-solvent; and particularly, modifiers which are liquid at normal temperatures will, other things being equal, impart greater flexibility than those which are solid at normal temperatures.

I have found that the neutral esters of phthalic acid (that is, ortho-phthalic acid) in which at least one of the alcohol radicals is a butyl group are more suitable as modifiers than most substances which have heretofore been proposed for this purpose.

By the expression "neutral butyl phthalates" I include not only a dibutyl phthalate but also the mixed esters such as methyl butyl, ethyl butyl, and propyl butyl, phthalates. I prefer to use esters of the kind above indicated in which the butyl radical is that of normal butyl alcohol rather than of isobutyl alcohol, and specifically, di (normal) butyl phthalate.

The procedure which may be followed to produce the above-mentioned butyl phthalic acid esters may be illustrated by the following examples:—

From phthalic anhydride.

Three parts by weight of phthalic anhydride are added to 3½ parts of normal butyl alcohol (B. P. 115–117° C.) and the mixture heated to 117° C. for eight hours. This completes the first reaction with the formation of mono-butyl phthalate which remains dissolved in the excess alcohol. Three per cent by weight of dry hydrogen chloride is dissolved in the mixture, which is heated to 117° for eight hours. The second reaction is accompanied by the separation of a layer of water. This is separated and the heating continued for an additional eight hours. The resulting liquid product is first washed with water to remove the hydrochloric acid; then with strong sodium carbonate to remove the mono-butyl phthalate and any free phthalic acid; and finally with water several times until neutral. The dibutyl phthalate is purified from alcohol and dried by passing a current of air through the liquid heated to 160° C. The product is a liquid, odorless, slightly yellow in color and may be obtained water white by distilling under diminished pressure. The yield is 83.6% of the theoretical. Boiling point under 29 mm. pressure is 210° C.

From phthalic acid.

The use of phthalic acid requires a catalyst for both stages of the reaction. One part by weight of phthalic acid is mixed with 2.5 parts of normal butyl alcohol (B. P. 115–117° C.). Three per cent by weight of dry hydrogen chloride is dissolved in the mixture, which is heated to 117° for twenty-four hours. The water which forms as a lower layer is drawn off from time to time and more hydrogen chloride added toward the latter part of the heating. The product is washed and purified in the same manner as described above. The yield from phthalic acid is 79.2% of the theoretical.

*Mono-butyl phthalate.*

Mono-butyl phthalate is obtained as a by-product from either of the above methods and is recovered by acidifying the sodium carbonate wash waters. This can be utilized in the preparation of di-butyl phthalate or for the purpose of making mixed esters. It is a white crystalline solid melting at 73–74° C., soluble in all the usual organic solvents and in alkali. Recrystallized from acetone or alcohol it is obtained in large rhombic plates.

The cellulosic compositions, and particularly the cellulose esters such as the acetate and nitrate, containing a butyl phthalic acid ester as a modifier have a practical application in many arts as, for example, in artificial leather, celluloid, lacquers, photographic film, etc.

In preparing the new cellulosic compositions, the butyl phthalic acid ester may be used in various proportions depending upon the result sought, as will be readily understood. As one illustrative example of the practice of the invention, I may incorporate thirty parts by weight of dibutyl phthalate with 100 parts of cellulose nitrate.

For producing flexible films, a suitable solution may be prepared by dissolving cellulose nitrate and dibutyl phthalate in the ordinary solvents such as ethyl acetate, benzene, methyl or ethyl alcohol and acetone, etc. Pigments and colors may be incorporated, and also, in the production of plastics, a suitable amount of a stabilizer, such as urea.

The properties of di (normal) butyl phthalate (and in general of the neutral butyl phthalates above described) which make it especially valuable in pyroxylin compositions may be listed as follows:

1. It is a solvent for pyroxylin.
2. It is a liquid at ordinary temperatures and does not crystallize when cooled very much below room temperature, for example to $-17°$ C.
3. It has a very low volatility at ordinary temperatures.
4. It undergoes practically no change on storage either in bulk or in a pyroxylin film.
5. It is colorless.

The neutral butyl phthalates are new substances and are claimed as such in my copending application Ser. No. 428,018 filed December 3, 1920.

I claim:—

1. A composition comprising essentially a cellulose ester and, as a modifier therefor, a neutral butyl phthalate.
2. A composition comprising essentially a cellulose ester and, as a modifier therefor, di-butyl phthalate.
3. A composition containing a cellulose ester and a neutral (normal) butyl phthalate.
4. A composition containing a cellulose ester and a di (normal) butyl phthalate.
5. A composition containing cellulose nitrate and a neutral butyl phthalate.
6. A composition containing cellulose nitrate and a neutral normal-butyl phthalate.
7. A composition containing cellulose nitrate and di (normal) butyl phthalate.
8. A film comprising a cellulose ester in admixture with a neutral butyl phthalate.
9. A film comprising a cellulose ester in admixture with di (normal) butyl phthalate.

In testimony whereof I affix my signature.

EBENEZER EMMET REID.